US012616906B2

(12) United States Patent  
Fukutomi et al.

(10) Patent No.: US 12,616,906 B2  
(45) Date of Patent: May 5, 2026

(54) AMUSEMENT GAME EQUIPMENT

(71) Applicant: Bandai Namco Experience Inc., Tokyo (JP)

(72) Inventors: Yasuji Fukutomi, Mibu-machi (JP); Masahide Uchida, Yokohama (JP); Takafumi Shirai, Kokubunji (JP); Hiroki Nakamura, Tokyo (JP)

(73) Assignee: BANDAI NAMCO AMUSEMENT INC., Tokyo (JP)

( * ) Notice: Subject to any disclaimer, the term of this patent is extended or adjusted under 35 U.S.C. 154(b) by 261 days.

(21) Appl. No.: 18/602,447

(22) Filed: Mar. 12, 2024

(65) Prior Publication Data

US 2024/0350927 A1 Oct. 24, 2024

(30) Foreign Application Priority Data

Apr. 21, 2023 (JP) ................................. 2023-070423

(51) Int. Cl.
| | |
|---|---|
| *A63F 13/90* | (2014.01) |
| *A63F 13/803* | (2014.01) |
| *A63F 13/245* | (2014.01) |

(52) U.S. Cl.
CPC ............ *A63F 13/90* (2014.09); *A63F 13/803* (2014.09); *A63F 13/245* (2014.09)

(58) Field of Classification Search
CPC ...... A63F 13/245; A63F 13/28; A63F 13/803; A63F 13/90
See application file for complete search history.

(56) References Cited

U.S. PATENT DOCUMENTS

| | | | | |
|---|---|---|---|---|
| 4,418,911 A | * | 12/1983 | Bowers | A63F 13/28 |
| | | | | 463/47 |
| 4,960,117 A | * | 10/1990 | Moncrief | A63F 13/245 |
| | | | | 463/46 |
| 5,022,708 A | * | 6/1991 | Nordella | G09B 9/14 |
| | | | | 248/398 |
| 5,299,810 A | * | 4/1994 | Pierce | A63F 13/285 |
| | | | | 463/2 |
| 5,707,237 A | * | 1/1998 | Takemoto | A63F 13/285 |
| | | | | 348/121 |
| 5,772,504 A | * | 6/1998 | Machiguchi | A63F 13/803 |
| | | | | 463/6 |

(Continued)

FOREIGN PATENT DOCUMENTS

JP H11-052835 A 2/1999

*Primary Examiner* — Chase E Leichliter  
(74) *Attorney, Agent, or Firm* — Oliff PLC

(57) ABSTRACT

Amusement game equipment supports a ride section on which a user rides by an air spring section, measures a height of a reference plane of the ride section with a sensor, and controls air supply and discharge into/from the air spring section according to game progress by a control section. The control section performs a calibration process for determining an ascent limit of the ride section based on a measured value by the sensor so as to set an ascent and descent control range excluding a predetermined margin from the ascent limit, and a target height setting process for setting a target height of the ride section within the ascent and descent control range according to the game progress, and controls the air supply and discharge into/from the air spring section to achieve the target height.

10 Claims, 13 Drawing Sheets

(56) References Cited

U.S. PATENT DOCUMENTS

| | | | | |
|---|---|---|---|---|
| 5,772,513 A * | 6/1998 | Ohishi | A63F 13/24 | 472/60 |
| 5,865,624 A * | 2/1999 | Hayashigawa | G09B 9/04 | 472/60 |
| 5,915,786 A * | 6/1999 | Kotani | A63F 13/90 | 297/217.7 |
| 5,964,666 A * | 10/1999 | Uemura | A63G 31/00 | 472/2 |
| 6,083,106 A * | 7/2000 | McDowell | A63F 13/803 | 463/6 |
| 6,132,314 A * | 10/2000 | Aiki | A63B 71/0622 | 463/36 |
| 6,142,877 A * | 11/2000 | Nishimura | A63F 13/42 | 434/69 |
| 6,217,445 B1 * | 4/2001 | Inoue | G09B 9/048 | 463/6 |
| 6,224,491 B1 * | 5/2001 | Hiromi | A63G 31/007 | 472/60 |
| 6,752,716 B1 * | 6/2004 | Nishimura | A63F 13/285 | 434/69 |
| 7,413,514 B2 * | 8/2008 | Saikawa | A63F 13/537 | 463/46 |
| 8,734,157 B1 * | 5/2014 | Hummel, III | A47C 1/00 | 434/247 |
| 2001/0021667 A1 * | 9/2001 | Fujimoto | A63F 13/245 | 463/36 |
| 2005/0069839 A1 * | 3/2005 | Denne | G09B 9/165 | 434/29 |
| 2005/0159219 A1 * | 7/2005 | Oswald | A63F 13/98 | 463/36 |
| 2005/0255925 A1 * | 11/2005 | Brase | A63F 13/90 | 463/47 |
| 2007/0075576 A1 * | 4/2007 | Kondo | A47C 1/12 | 297/260.2 |
| 2007/0262628 A1 * | 11/2007 | Perigny | A63F 13/28 | 297/284.4 |
| 2008/0167122 A1 * | 7/2008 | Maeda | A63F 13/577 | 463/30 |
| 2009/0082077 A1 * | 3/2009 | Sugimori | A63F 13/245 | 463/40 |
| 2009/0163283 A1 * | 6/2009 | Childress | A63F 13/28 | 463/47 |
| 2009/0209309 A1 * | 8/2009 | Wu | A63F 13/213 | 463/6 |
| 2009/0286602 A1 * | 11/2009 | Chang | A63F 13/803 | 463/37 |
| 2011/0124413 A1 * | 5/2011 | Levanon | G06F 3/016 | 340/407.1 |
| 2013/0031997 A1 * | 2/2013 | Caravella | B64C 13/0423 | 74/471 R |
| 2013/0316826 A1 * | 11/2013 | Levanon | A63F 13/285 | 463/36 |
| 2014/0309035 A1 * | 10/2014 | Crawford | A63F 13/285 | 463/36 |
| 2015/0316130 A1 * | 11/2015 | Rousseau | F16H 25/20 | 74/89.23 |
| 2015/0323049 A1 * | 11/2015 | Rousseau | F16C 11/04 | 403/119 |
| 2016/0111014 A1 * | 4/2016 | Lin | G09B 9/042 | 434/62 |
| 2016/0303473 A1 * | 10/2016 | Cheung | A47C 15/004 | |
| 2019/0220087 A1 * | 7/2019 | Ishii | A63B 69/18 | |
| 2020/0289950 A1 * | 9/2020 | Krauthamer | A63G 31/16 | |
| 2021/0052989 A1 * | 2/2021 | Blum | A63F 13/80 | |
| 2023/0256352 A1 * | 8/2023 | HajiChristou | A63G 31/16 | 472/59 |
| 2024/0350927 A1 * | 10/2024 | Fukutomi | A63F 13/803 | |

* cited by examiner

FIG.5

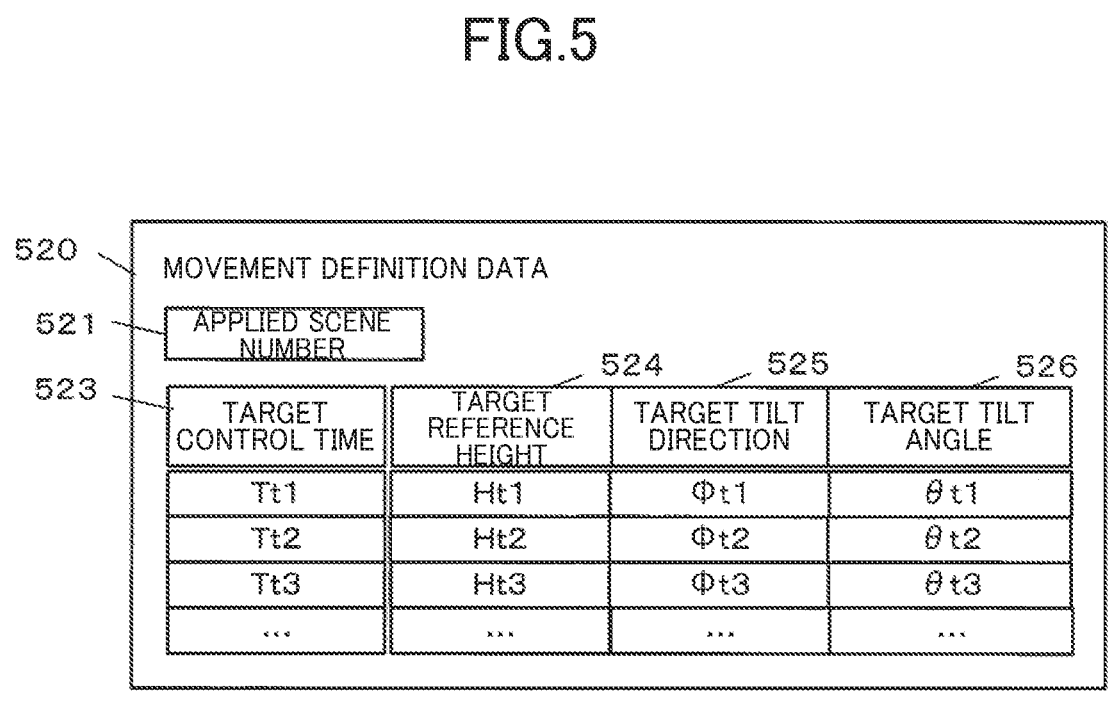

| MOVEMENT DEFINITION DATA | | | |
|---|---|---|---|
| APPLIED SCENE NUMBER | | | |
| TARGET CONTROL TIME | TARGET REFERENCE HEIGHT | TARGET TILT DIRECTION | TARGET TILT ANGLE |
| Tt1 | Ht1 | Φt1 | θt1 |
| Tt2 | Ht2 | Φt2 | θt2 |
| Tt3 | Ht3 | Φt3 | θt3 |
| ... | ... | ... | ... |

520

521

523

524    525    526

FIG.6
(1)
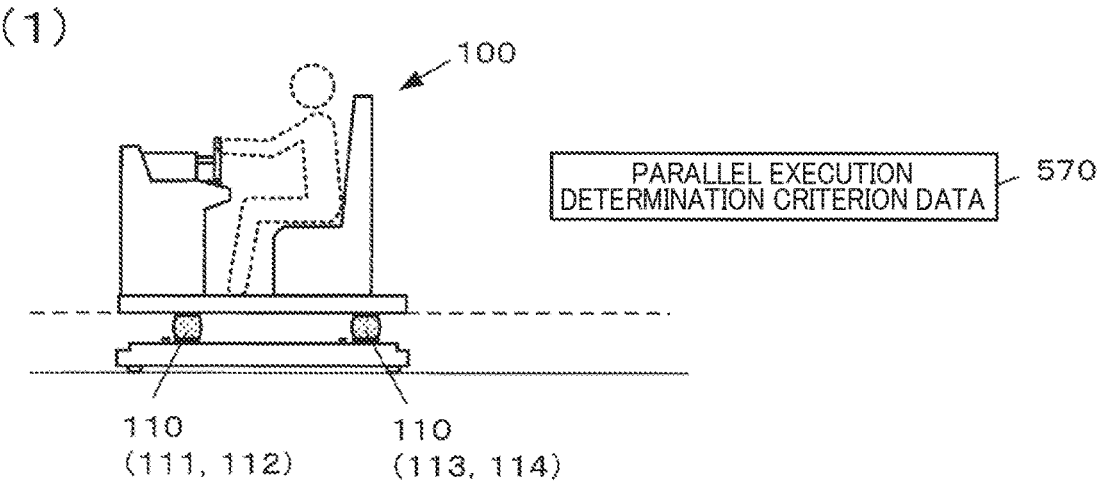
100
PARALLEL EXECUTION
DETERMINATION CRITERION DATA — 570
110
(111, 112)
110
(113, 114)
(2)
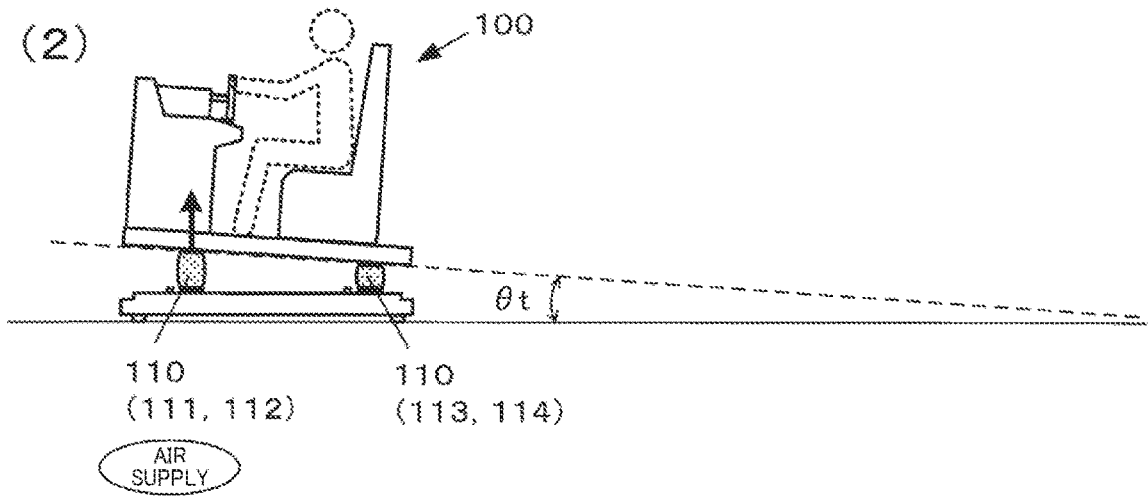
100
$\theta t$
110
(111, 112)
110
(113, 114)
AIR
SUPPLY
(3)
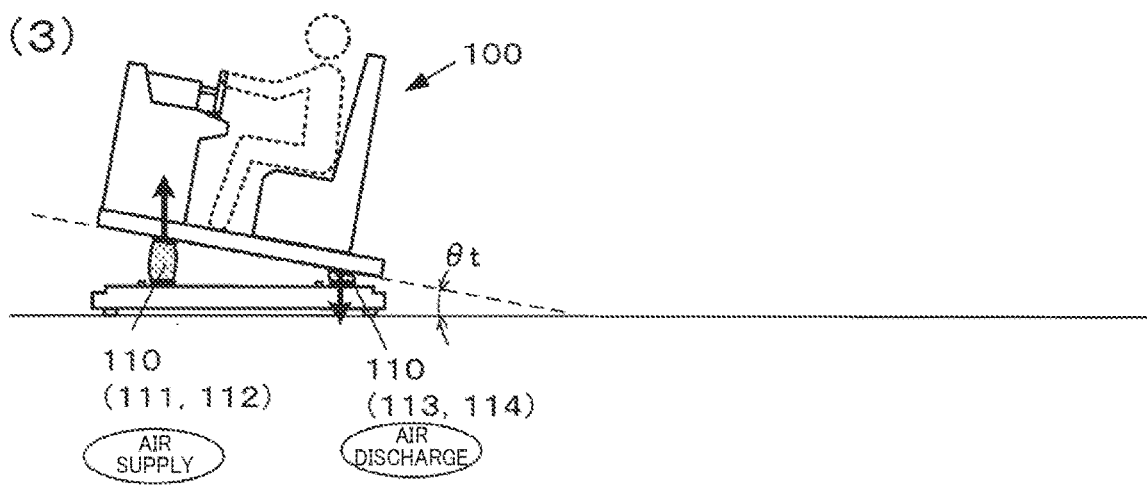
100
$\theta t$
110
(111, 112)
110
(113, 114)
AIR
SUPPLY
AIR
DISCHARGE

FIG.8

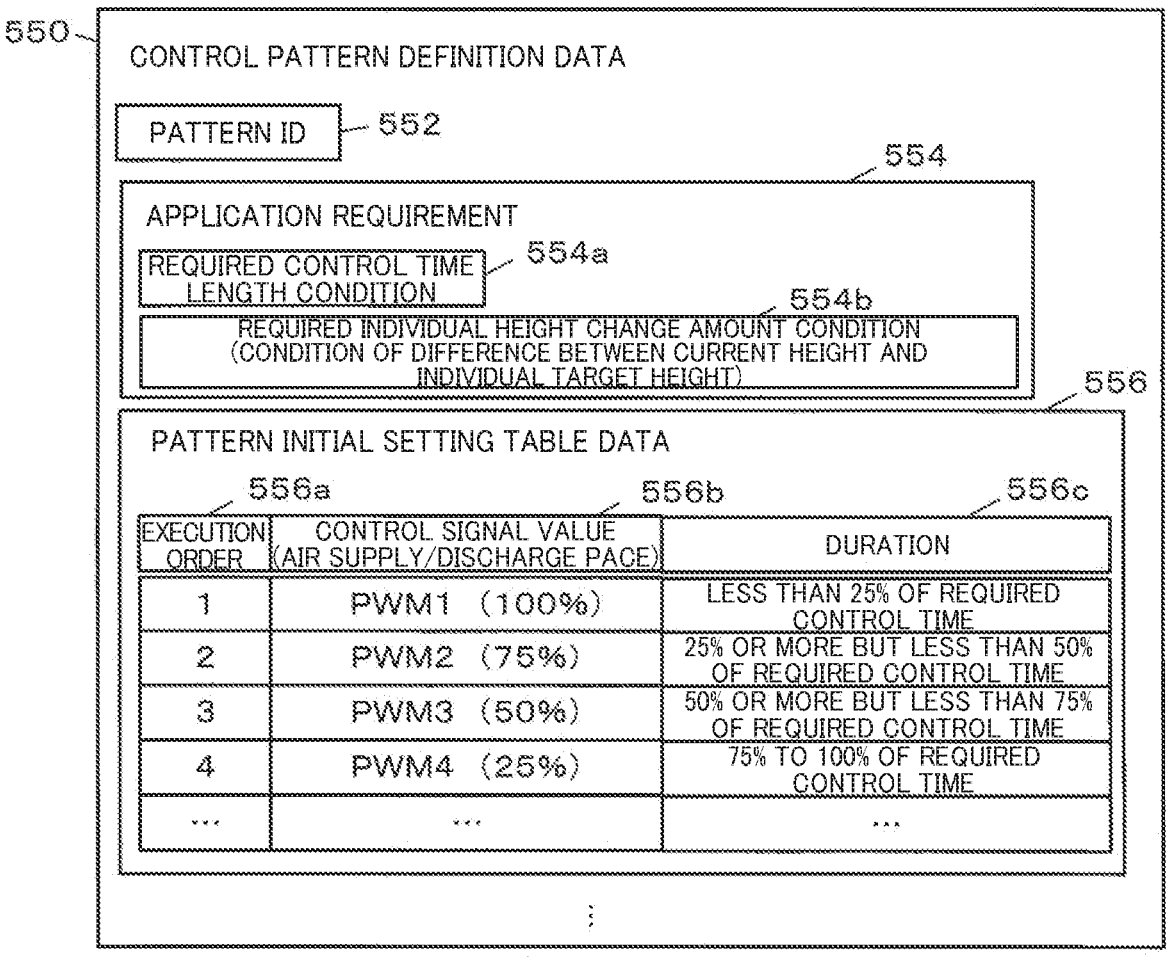

550 — CONTROL PATTERN DEFINITION DATA

PATTERN ID — 552

554

APPLICATION REQUIREMENT

REQUIRED CONTROL TIME LENGTH CONDITION — 554a

REQUIRED INDIVIDUAL HEIGHT CHANGE AMOUNT CONDITION (CONDITION OF DIFFERENCE BETWEEN CURRENT HEIGHT AND INDIVIDUAL TARGET HEIGHT) — 554b

556

PATTERN INITIAL SETTING TABLE DATA

| EXECUTION ORDER 556a | CONTROL SIGNAL VALUE (AIR SUPPLY/DISCHARGE PACE) 556b | DURATION 556c |
|---|---|---|
| 1 | PWM1 (100%) | LESS THAN 25% OF REQUIRED CONTROL TIME |
| 2 | PWM2 (75%) | 25% OR MORE BUT LESS THAN 50% OF REQUIRED CONTROL TIME |
| 3 | PWM3 (50%) | 50% OR MORE BUT LESS THAN 75% OF REQUIRED CONTROL TIME |
| 4 | PWM4 (25%) | 75% TO 100% OF REQUIRED CONTROL TIME |
| … | … | … |

FIG.13

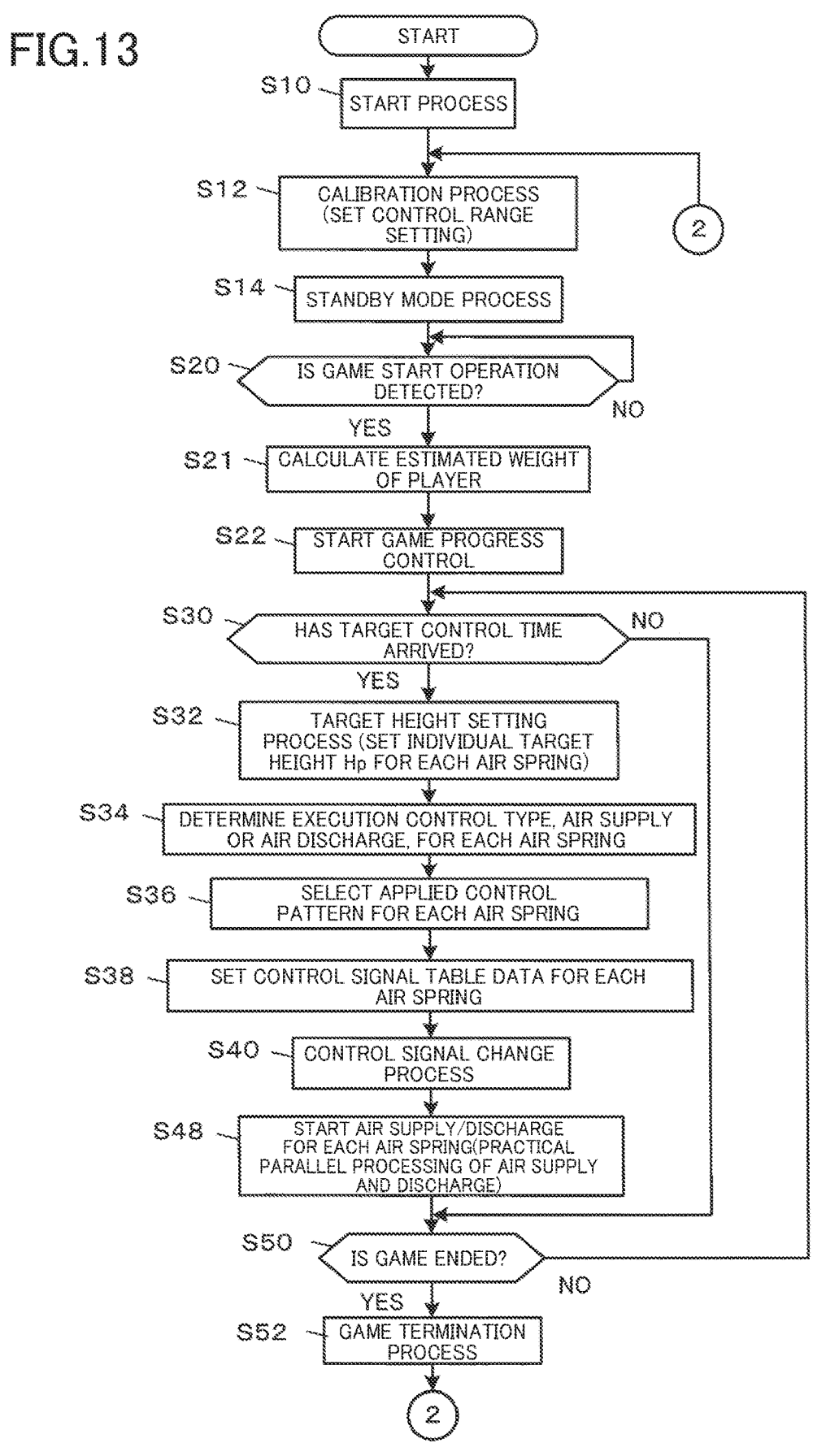

START

S10 — START PROCESS

S12 — CALIBRATION PROCESS (SET CONTROL RANGE SETTING)

②

S14 — STANDBY MODE PROCESS

S20 — IS GAME START OPERATION DETECTED?  NO

YES

S21 — CALCULATE ESTIMATED WEIGHT OF PLAYER

S22 — START GAME PROGRESS CONTROL

S30 — HAS TARGET CONTROL TIME ARRIVED?  NO

YES

S32 — TARGET HEIGHT SETTING PROCESS (SET INDIVIDUAL TARGET HEIGHT Hp FOR EACH AIR SPRING)

S34 — DETERMINE EXECUTION CONTROL TYPE, AIR SUPPLY OR AIR DISCHARGE, FOR EACH AIR SPRING

S36 — SELECT APPLIED CONTROL PATTERN FOR EACH AIR SPRING

S38 — SET CONTROL SIGNAL TABLE DATA FOR EACH AIR SPRING

S40 — CONTROL SIGNAL CHANGE PROCESS

S48 — START AIR SUPPLY/DISCHARGE FOR EACH AIR SPRING(PRACTICAL PARALLEL PROCESSING OF AIR SUPPLY AND DISCHARGE)

S50 — IS GAME ENDED?  NO

YES

S52 — GAME TERMINATION PROCESS

②

AMUSEMENT GAME EQUIPMENT

CROSS REFERENCE TO RELATED APPLICATION

This application is based upon and claims the benefit of priority to Japanese Patent Application No. 2023-070423 filed on Apr. 21, 2023, the entire contents of which are incorporated herein by reference.

BACKGROUND OF THE INVENTION

As an example of popular arcade amusement game equipment, ride-type body experience amusement game equipment is known (e.g., see Japanese Unexamined Patent Application Publication No. 11-52835). In the ride-type body experience amusement game equipment, a ride section on which a user of a player rides tilts or vibrates according to game progress. The user feels movements or vibrations corresponding to events in a game while playing the game, so that the user can have a game experience much better than a game experience given by amusement game equipment that is not a body experience type and the ride section of which is fixed and does not move.

An air spring used in the conventional ride-type body experience amusement game equipment is simply controlled such that air is supplied by fully opening a solenoid valve for air supply until the air spring reaches its maximum stroke when air is supplied to the air spring, and air is discharged by fully opening a solenoid valve for air discharge until the air spring reaches its minimum stroke when air is discharged.

Since air is supplied or discharged by fully opening the valves according to the game progress, frequent control is performed to quickly repeating the maximum stroke and the minimum stroke alternately, which is severe usage of the air spring. This shortens a service life of the air spring, and thus improvement has been desired. In addition, it has been also desired that the air supply and discharge into/from the air spring are more delicately controlled according to the game progress to provide a new body experience.

BRIEF DESCRIPTION OF THE DRAWINGS

FIG. 5 is a diagram illustrating a data configuration example of movement definition data.

FIG. 6 is a diagram illustrating a setting example of air supply/discharge.

FIG. 8 is a diagram illustrating a data configuration example of control pattern definition data.

FIG. 13 is a flowchart illustrating processes performed by the control section according to the modification example.

DETAILED DESCRIPTION

Figure 1:
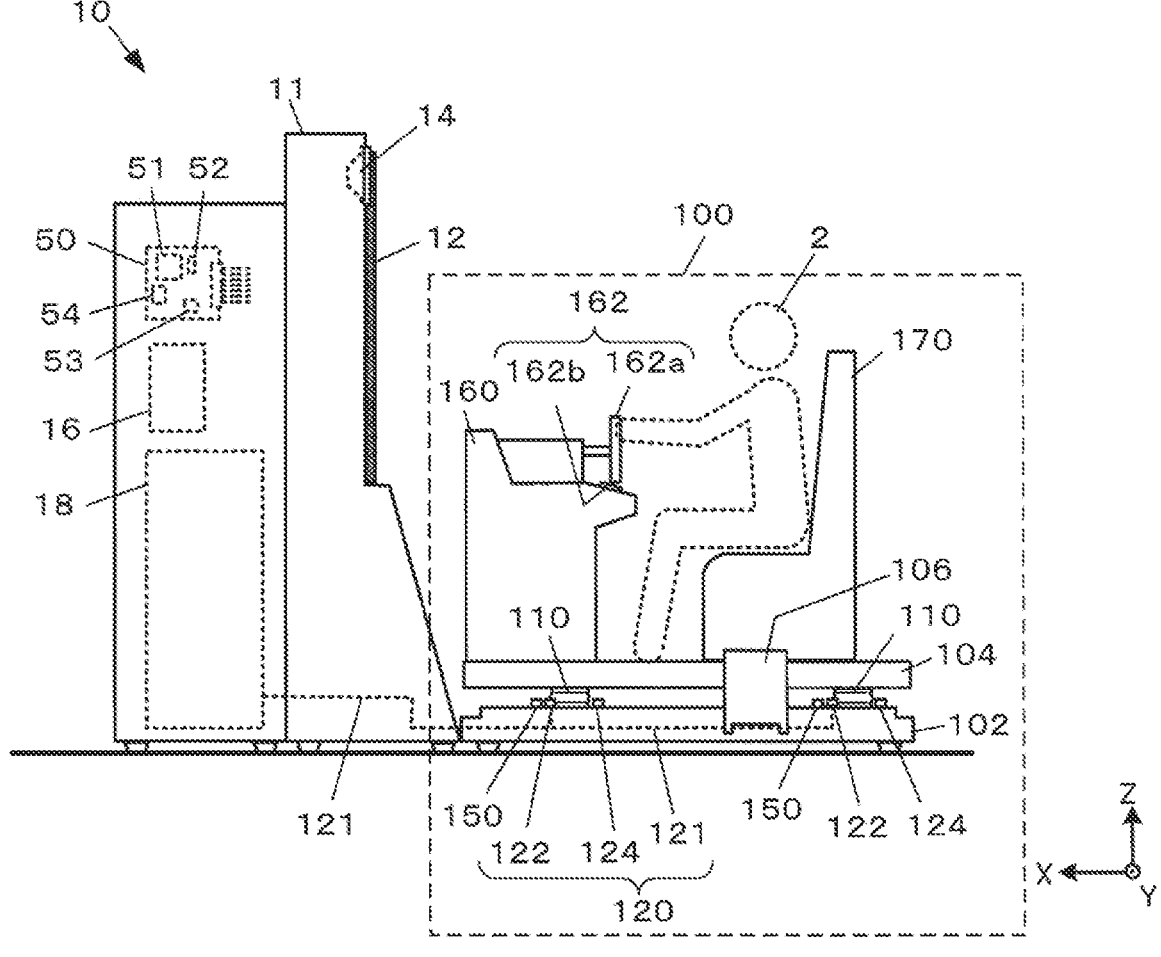
FIG. 1 is a side view of a configuration example of amusement game equipment.

The following disclosure provides many different embodiments, or examples, for implementing different features of the provided subject matter. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed. Further, when a first element is described as being "connected" or "coupled" to a second element, such description includes embodiments in which the first and second elements are directly connected or coupled to each other, and also includes embodiments in which the first and second elements are indirectly connected or coupled to each other with one or more other intervening elements in between.

According to the first aspect of the invention, there is provided an amusement game equipment comprising:

a ride section on which a user rides;

an air spring section configured to support the ride section;

an air supply/discharge adjustment section configured to perform air supply and discharge into/from the air spring section according to a given control signal;

a sensor configured to measure a height of a reference plane of the ride section; and a control section configured to generate the control signal according to game progress to control the air supply and discharge into/from the air spring section, wherein the control section performs a calibration process for controlling the air supply and discharge into/from the air spring section to determine an ascent limit of the ride section based on a measured value by the sensor so as to set an ascent and descent control range excluding a predetermined margin from the ascent limit, performs a target height setting process for setting a target height of the ride section within the ascent and descent control range according to the game progress, and generates the control signal for controlling the air supply and discharge into/from the air spring section to achieve the target height.

According to the disclosure, in some embodiments, the ascent and descent control range is set within a range that the ride section does not reach the ascent limit by the calibration process. Then, an air spring is controlled to ascend and descend within the ascent and descent control range. Accordingly, this eliminates "effects of an impact of high expansion pressure at the moment the air spring reaches its maximum stroke (ascent limit)", which is one of the factors that shorten a service life of the air spring in conventional ride-type body experience amusement game equipment, and frequent control for quickly repeating the maximum stroke and a minimum stroke alternately. As a result, a new control technique related to the air supply and discharge of the air spring supporting the ride section can be implemented.

According to the second aspect of the invention, there is provided the amusement game equipment, wherein the control section determines a descent limit of the ride section based on the measured value by the sensor, and sets a position higher than the descent limit by a predetermined margin as a lower limit of the ascent and descent control range in the calibration process, and generates the control signal such that a current height based on the measured value by the sensor does not fall below the lower limit of the ascent and descent control range.

According to the disclosure, in some embodiments, the air spring is controlled not to reach the minimum stroke (descent limit), or "hit the bottom", so to speak. As a result, the ride section is always maintained in an elastically supported state by air, so that a comfortable ride quality is secured.

According to the third aspect of the invention, there is provided the amusement game equipment, wherein the control section generates the control signal to gradually reduce an air supply/discharge amount into/from the air spring section as a current height based on the measured value by the sensor approaches the target height.

According to the disclosure, in some embodiments, the height of the air spring is controlled to reach the target height not quickly but gently. As a result, compared with conventional control that instantly stops the air supply and discharge when the height reaches the target height, the ride quality of the ride section is greatly improved.

According to the fourth aspect of the invention, there is provided the amusement game equipment, wherein the control section selects an applied control pattern according to the game progress from a plurality of control patterns having different paces of the air supply/discharge amount, and generates the control signal based on the applied control pattern.

Various events happen in a game according to the game progress, and thus, the ride section is preferably controlled to ascend and descend according to these events. That is, there are a case where quick air supply and discharge are preferable and a case where gentle air supply and discharge are preferable depending on intended stage effects.

According to the disclosure, in some embodiments, the pace of the air supply/discharge amount into/from the air spring section appropriate for the game progress can be selected, so that flexibility of stage effect expression can be enhanced while extending the service life of the air spring.

According to the fifth aspect of the invention, there is provided the amusement game equipment, wherein at least one reference height with respect to a lapse time is set to each of the plurality of control patterns, and wherein the control section generates the control signal such that the current height based on the measured value by the sensor follows the applied control pattern.

According to the disclosure, in some embodiments, the amusement game equipment can control the air supply and discharge such that the current height follows the reference height with respect to the lapse time. By preparing various control patterns depending on a setting of the reference height with respect to the lapse time, the air supply and discharge into/from the air spring are variously controlled, so that the stage effects of various movements of the ride section can be produced.

According to the sixth aspect of the invention, there is provided the amusement game equipment, wherein the control section selects an applied control pattern from a plurality of control patterns having different paces of the air supply/discharge amount based on a difference between the current height based on the measured value by the sensor and the target height, and generates the control signal based on the applied control pattern.

According to the disclosure, in some embodiments, the amusement game equipment selects the applied control pattern based on the difference between the current height and the target height, so that the air supply and discharge can be controlled with the appropriate control pattern in consideration of a magnitude of the difference between the current height and the target height to produce the stage effects of the movements of the ride section.

According to the seventh aspect of the invention, the above amusement game equipment further comprise an operation section operated by the user during gameplay, wherein the control section generates the control signal to variably control the air supply and discharge into/from the air spring section based on operation of the operation section.

According to the disclosure, in some embodiments, the amusement game equipment can change the control of the air supply and discharge based on the operation by the user during the gameplay. As a result, the movements and tilts of the ride section are changed by the operation by the user, so that quality as the body experience game can be improved to enrich a game experience.

According to the eighth aspect of the invention, there is provided the amusement game equipment, wherein the air spring section includes a plurality of air springs that support different positions of the ride section, wherein the air supply/discharge adjustment section individually performs the air supply and discharge for each of the plurality of air springs, wherein the sensor measures, for each of the plurality of air springs, the height of the reference plane of the ride section supported by each of the plurality of air springs, wherein the target height setting process includes setting a target tilt direction and a target tilt angle of the ride section generated by a difference in the heights supported by the plurality of air springs according to the game progress, and wherein the control section selects both at least one air spring to supply air and at least one air spring to discharge air based on the measured value of each of the plurality of air springs measured by the sensor, the target tilt direction, and the target tilt angle, and generates the control signals to perform the air supply and discharge in parallel.

According to the disclosure, in some embodiments, it is possible to implement the amusement game equipment in which the ride section is supported by the plurality of air springs and the air supply and discharge are controlled for each of the plurality of air springs. In addition, the air supply to the air spring subject to the air supply and the air discharge from the air spring subject to the air discharge can be performed in parallel. As a result, flexibility of posture control of the ride section can be enhanced.

According to the ninth aspect of the invention, the above amusement game equipment further comprise a regulation section configured to regulate a change of a position of the ride section in a height direction exceeding a predetermined limited height.

According to the disclosure, in some embodiments, the amusement game equipment can regulate the change of the position of the ride section in the height direction exceeding the predetermined limited height, so that safety can be enhanced.

Hereinafter, examples of embodiments of the present disclosure are described with reference to the drawings. However, modes to which the present disclosure is applicable are not limited to the following embodiments. Three orthogonal axes XYZ illustrated in the drawings commonly indicate directions of equipment.

FIG. 1 a side view of a configuration example of amusement game equipment 10 according to the present embodiment.

The amusement game equipment 10 includes a ride section 100 on which a user 2 of a player rides, and a cabinet 11 disposed in front of the ride section 100 (in a front direction from the user 2 on board; on a left side in a plus direction of the X axis in FIG. 1).

The cabinet 11 includes a display 12 that displays a game image toward the ride section 100, a speaker 14 that emits sound effects of a game toward the ride section 100, a power supply device 16, an air pressure generator 18, and a control section 50.

The air pressure generator 18 generates and temporarily stores high-pressure compressed air that can be supplied externally. The air pressure generator 18 includes, for example, a motor-driven compressor and a tank. The air pressure generator 18 may also include a cooler, filters or the like as appropriate.

Figure 2:
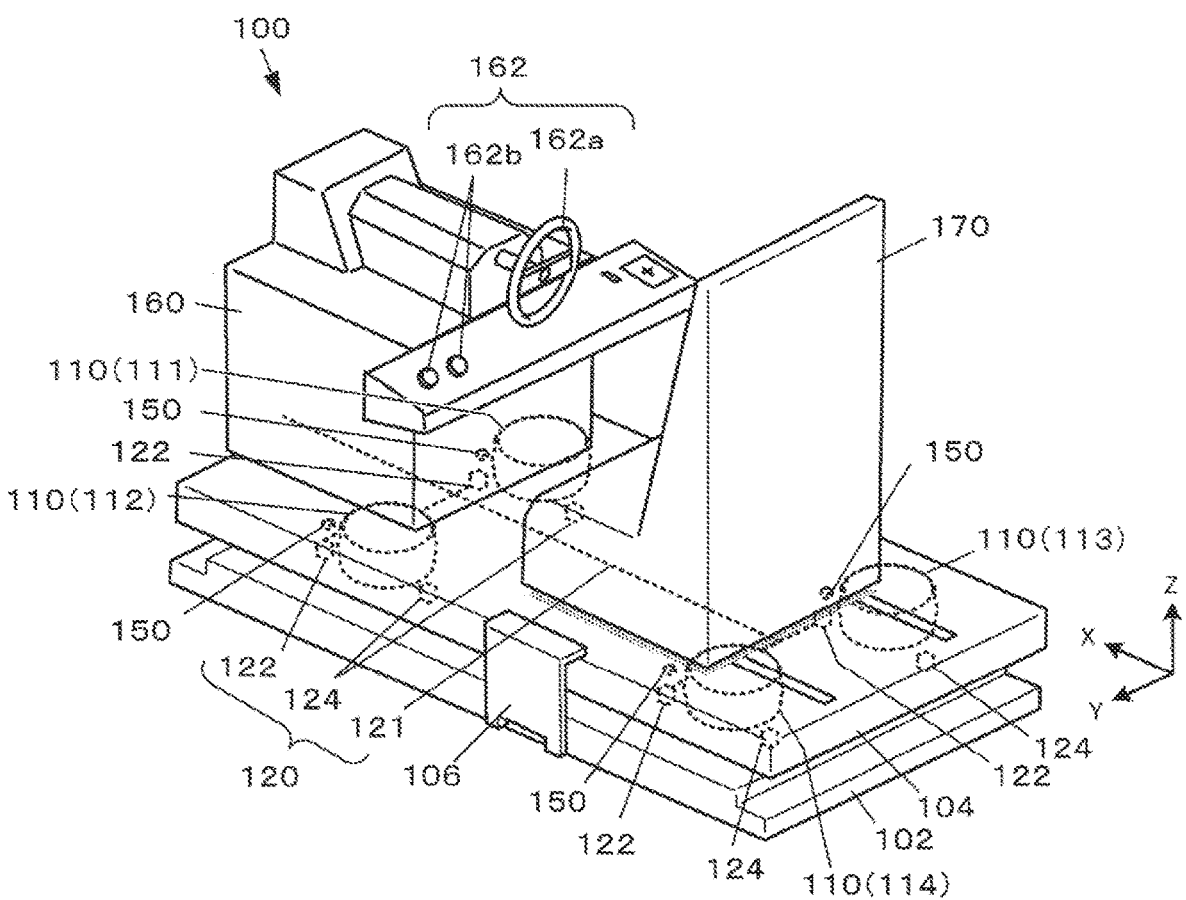
FIG. 2 is a perspective external view of a configuration example of a ride section.

FIG. 2 is a perspective external view of a configuration example of the ride section 100.

The ride section 100 includes a base 102, an air spring section 110 that supports a floorboard 104 above the base 102, an air supply/discharge adjustment section 120 that supplies and discharges air into/from the air spring section 110, a sensor 150, and a regulation section 106. The sensor 150 measures a distance from the base 102 to the floorboard 104. The distance measured by the sensor 150 can be said to be a floorboard height, an air spring height, or a height of a reference plane of the ride section 100.

The regulation section 106 is a member that regulates movements of the floorboard 104 with respect to the base 102 within a predetermined range. For example, if air is excessively supplied to the air spring section 110 due to execution of a calibration process of the sensor 150, a stroke of the air spring section 110 is physically regulated to prevent damage to the air spring section 110. The regulation section 106 is implemented by, for example, an elastic member fixed to one of the base 102 and the floorboard 104 and coupled to another one of the base 102 and the floorboard 104 with a gap, or a chain member, a wire member, a belt, or an elastic member that connects the base 102 and the floorboard 104.

The air spring section 110 is a pneumatic actuator that is expanded and contracted by supplying and discharging compressed air into/from a rubber bellows sandwiched between two mounting plates. The air spring section 110 includes a first air spring 111 supporting the right front side of the floorboard 104, a second air spring 112 supporting the left front side of the floorboard 104, a third air spring 113 supporting the right rear side of the floorboard 104, and a fourth air spring 114 supporting the left rear side of the floorboard 104.

Figure 3:
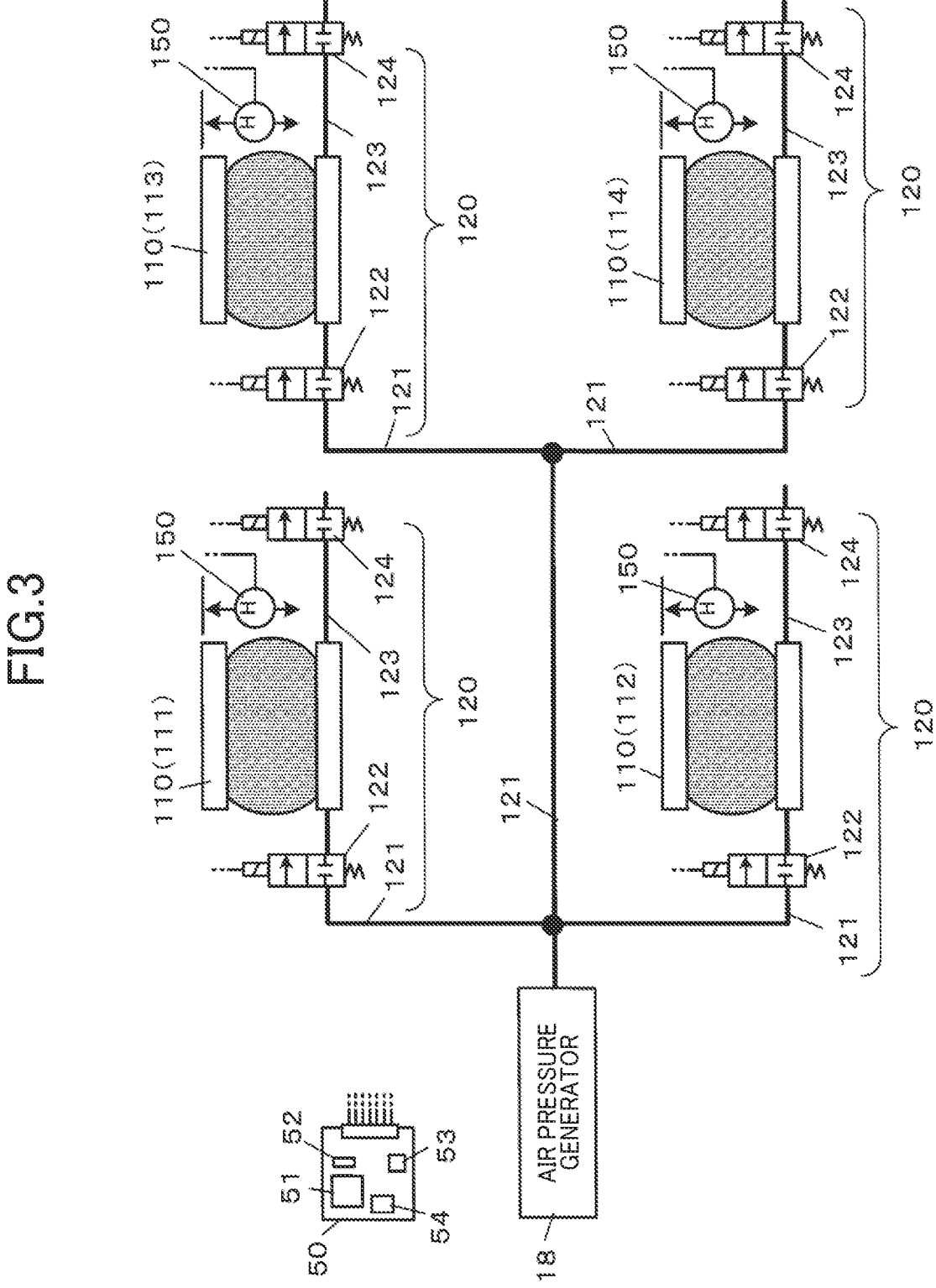
FIG. 3 is a diagram illustrating a configuration example of an air pressure adjustment section.

FIG. 3 is a diagram illustrating a configuration example of the air supply/discharge adjustment section 120.

The air supply/discharge adjustment section 120 includes an air supply pipe 121 connecting the air pressure generator 18 and the air spring section 110, an air supply solenoid valve 122, an air discharge pipe 123, and an air discharge solenoid valve 124.

The air supply solenoid valve 122 and the air discharge solenoid valve 124 are implemented, for example, by a direct-acting, normally-closed proportional control solenoid valve. The air supply solenoid valve 122 is disposed for each of the first air spring 111 to the fourth air spring 114, and opens and closes an air supply valve from the air supply pipe 121 according to a control signal from the control section 50.

The air discharge solenoid valve 124 is provided for each of the first air spring 111 to the fourth air spring 114, and opens and closes an air discharge valve to the air discharge pipe 123 according to a control signal from the control section 50. A silencer may be disposed at an end of the air discharge pipe 123 as appropriate.

The sensor 150 is implemented, for example, by a laser ranging sensor. A type of the sensor 150 is not limited to this, and can be set as appropriate, of course. The sensor 150 is disposed for each of the first air spring 111 to the fourth air spring 114, and outputs a measurement signal corresponding to a measured value to the control section 50. The measured value by the sensor 150 practically indicates a current height of the corresponding air spring among the first air spring 111 to the fourth air spring 114, that is, the height of the reference plane of the ride section 100 supported by each of the air springs.

As illustrated in FIG. 2, the floorboard 104 includes an operation console 160 on an upper front portion and a seat 170 on an upper rear portion.

The operation console 160 includes one or more operation sections 162 that accept various types of operation input related to gameplay. Although the example in FIG. 2 illustrates a handle type controller 162a and operation switches 162b as the operation section 162, the operation section 162 is not limited to these. The operation section 162 may be, for example, a gun type controller, a throttle lever, a dial, an accelerator pedal, a brake pedal, or a boat oar type controller depending on a game operation type.

An appearance of the ride section 100 is preferably set to let the user 2 imagine a design of his/her own character in the game (a moving body that the user 2 of the player operates in the game).

Figure 4:
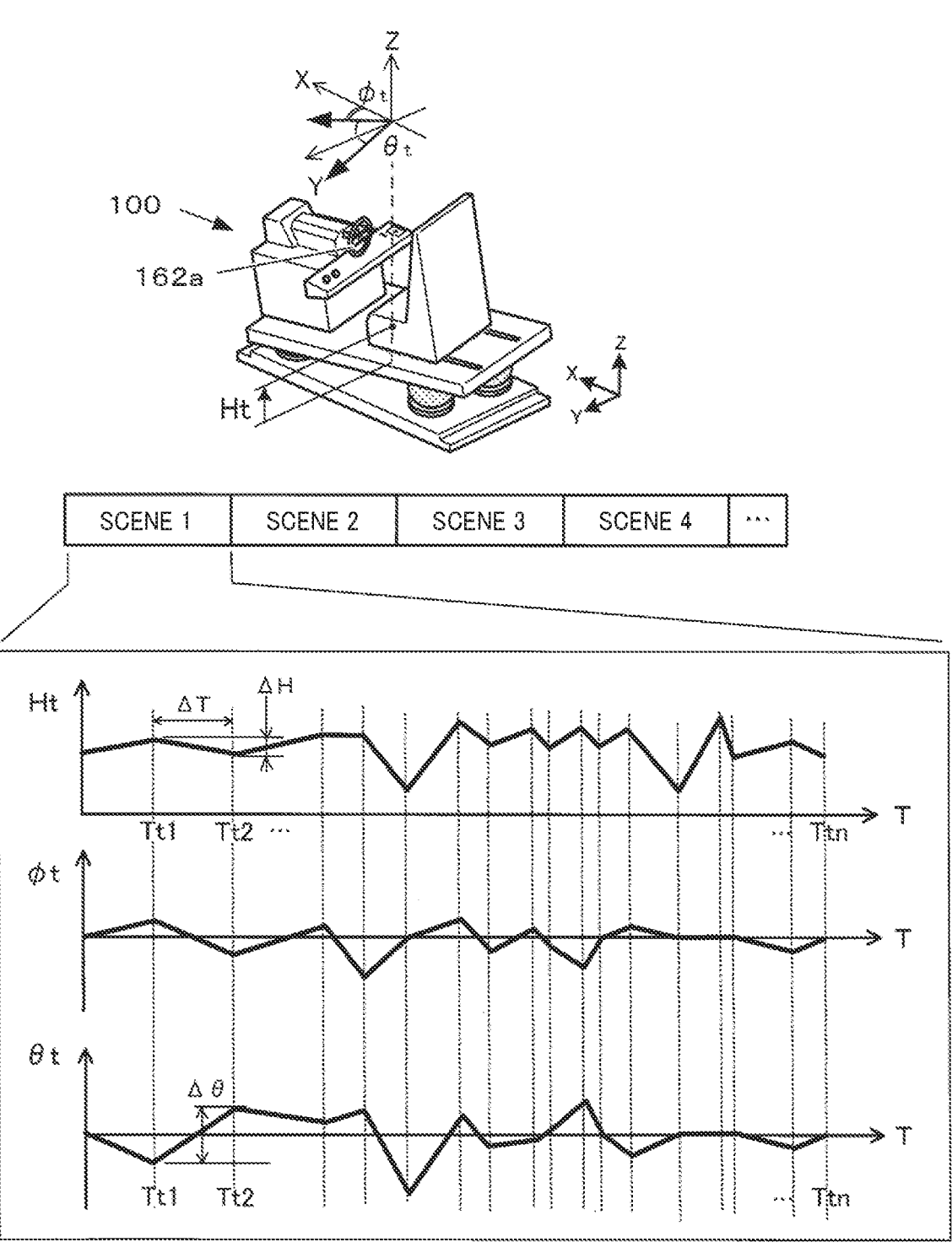
FIG. 4 is a diagram and a graph illustrating basic movement control of the ride section.

FIG. 4 is a diagram and a graph illustrating basic movement control (or tilt control) of the ride section 100 in a game scene. The game executed by the amusement game equipment 10 is a body experience game of a boat ride in a torrent river, for example. The user 2 of the player is on a small boat (floating moving body) going down a torrent river in a game world, and the display 12 shows an image seen when the user 2 looks ahead from the small boat for going down the torrent river. Several check points are set along the river. The user 2 of the player operates the handle type controller 162a to steer the small boat such that the small boat passes through the check points while being tossed about by a flow of the river. If the user 2 cannot pass through a predetermined number of check points in time, the game is over there. If the user 2 can pass through the predetermined number of check points, the user 2 can go on to a next game scene to continue the gameplay.

The ride section 100 functions as the small boat going down the torrent river in the game. The amusement game equipment 10 individually controls air supply/discharge into/from the first air spring 111 to the fourth air spring 114 in the air spring section 110 to make four points of the ride section 100 independently ascend and descend. Due to the independent ascent and descent of these four points, the ride section 100 can reproduce movements of the little boat in a real world.

An initial setting of the movement of the ride section 100 is determined beforehand for each game scene according to stage effects intended in the game scene. In particular, the movement of the ride section 100 is defined by a target reference height Ht, a target tilt direction φt, and a target tilt angle θt at a predetermined representative point of the floorboard 104 (e.g., a center of the floorboard 104). The target tilt direction φt and the target tilt angle θt are based on a spherical coordinate system.

The initial setting of the movement of the ride section 100 in each scene is stored beforehand, for example, as movement definition data 520 illustrated in FIG. 5, in an IC memory 52. The movement definition data 520 stores an applied scene number 521, and the target reference height Ht, the target tilt direction φt, and the target tilt angle θt in association with each of a plurality of target control times Tt indicating lapse times in the game.

Returning to FIG. 4, every time a certain target control time Tt (e.g., Tt1) arrives, the amusement game equipment 10 performs air supply/discharge control individually for the first air spring 111 to the fourth air spring 114 to implement the target reference height Ht, the target tilt direction φt, and the target tilt angle θt corresponding to a next target control time Tt (e.g., Tt2).

The amusement game equipment 10 determines whether to supply air or discharge air for each of the first air spring 111 to the fourth air spring 114 in order to implement the target reference height Ht, the target tilt direction φt, and the target tilt angle θt at the next target control time Tt.

FIG. 6 is a diagram illustrating a setting example of the air supply/discharge into/from the air springs.

As a premise, ascent and descent paces of the first air spring 111 to the fourth air spring 114 have limits. That is, a maximum air supply pace per unit time is determined by internal pressure of the air spring at the time, supplied pressure from the air pressure generator 18, specifications of the air supply pipe 121 and the air supply solenoid valve 122, or the like. Similarly, a maximum air discharge pace per unit time is determined by the internal pressure of the air spring at the time, specifications of the air discharge pipe 123 and the air discharge solenoid valve 118, or the like.

As illustrated in FIG. 6(1), the ride section 100 is horizontal at a current time (e.g., at the target control time Tt1 in FIG. 4), and a posture of the ride section 100 is going to be changed to raise a front of the ride section 100 higher than a current height at the next target control time Tt (e.g., at the target control time Tt2 in FIG. 4).

FIG. 6(2) illustrates a case where a change to the target tilt angle θt can be implemented by raising or lowering the air springs only on one side of the tilt direction within a length of time (required control time length ΔT) from the current target control time Tt to the next target control time Tt in view of the maximum air supply pace and the maximum air discharge pace. In this case, the amusement game equipment 10 performs control for supplying air into the air springs on a front side in the target tilt direction φt to raise the air springs and not supplying air (or supplying air only a little) into the air springs on a rear side, for example. Alternatively, the amusement game equipment 10 performs control for discharging air from the air springs on the rear side in the target tilt direction φt to lowers the air springs and not discharging air (or discharging air only a little) from the air springs on the front side.

FIG. 6(3) illustrates a case where the change to the target tilt angle θt cannot be implemented by raising or lowering the air springs only on one side of the tilt direction within the length of time (required control time length ΔT) from the current target control time Tt to the next target control time Tt in view of the maximum air supply pace and the maximum air discharge pace. In this case, the amusement game equipment 10 performs control for supplying air into the air springs on the front side in the target tilt direction φt to raise the air springs and discharging air from the air springs on the rear side to lowers the air springs, for example.

In this case, the control section 50 selects both the air springs to supply air and the air springs to discharge air based on the measured value of each of the air springs by the sensor 150, the target tilt direction φt, and the target tilt angle θt, and generates the control signals for the air supply solenoid valve 122 and the air discharge solenoid valve 118 to perform the air supply and discharge in parallel.

A determination criterion for determining whether the change to the target tilt angle θt "can be implemented or cannot be implemented" within the required control time length ΔT is determined beforehand as parallel execution determination criterion data 570.

The parallel execution determination criterion data 570 is a function that uses the required control time length ΔT, a required angle change amount 40 (a difference in height between a target control angle θt1 at the current target control time Tt1 and a target control angle θt2 at the next target control time Tt2), and a required height change amount ΔH (a difference in angle between a target reference height Ht1 at the current target control time Tt1 and a target reference height Ht2 at the next target control time Tt2) as variables, or table data.

Next, time-series ascent/descent control, that is, time-series air supply/discharge control of each of the first air spring 111 to the fourth air spring 114 from the current target control time Tt to the next target control time Tt is described.

The amusement game equipment 10 changes a control pattern of the air supply/discharge based on the required control time length ΔT and how much the height should be changed within the required control time length ΔT (required height change amount ΔH).

Figure 7:
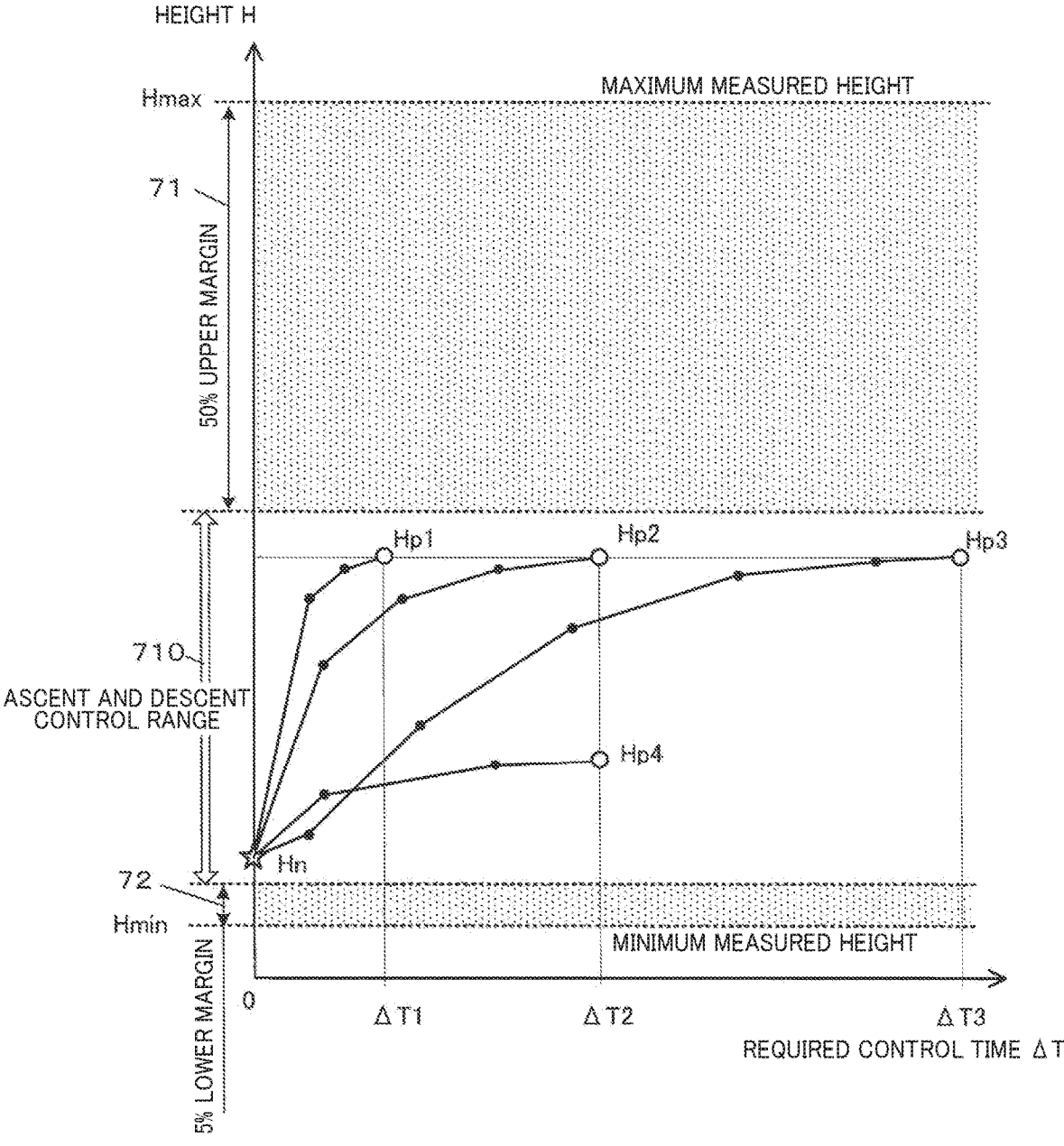
FIG. 7 is a graph illustrating control patterns of air supply/discharge control.

FIG. 7 is a graph illustrating examples of the control patterns of the air supply/discharge control. The amusement game equipment 10 sets, for each of the first air spring 111 to the fourth air spring 114, an individual target height Hp that the air spring needs to reach to implement the target reference height Ht at the next target control time Tt2, and calculates a difference (required individual height change amount ΔHp) from the current height Hn of each of the air springs. Then, the amusement game equipment 10 selects an applied control pattern from a prepared plurality of control patterns based on the required individual height change amount ΔHp and the required control time length ΔT.

The graph in FIG. 7 illustrates four control patterns with different combinations of the required control time length ΔT (ΔT1, ΔT2, and ΔT3) and the individual target height Hp (Hp1, Hp2, Hp3, and Hp4). A star represents the current height Hn. Small black dots represent "reference heights" corresponding to intermediate targets on the way to the individual target height Hp.

The amusement game equipment 10 sets the individual target height Hp for each of the air springs within an ascent and descent control range 710. The ascent and descent control range 710 is set between an ascent limit Hmax and a descent limit Hmin, excluding an upper margin 71 and a lower margin 72.

The ascent limit Hmax is a value measured by the sensor 150 at a maximum stroke of the corresponding air spring when air is gently supplied into the air spring. Similarly, the descent limit Hmin is a value measured by the sensor 150 at a minimum stroke of the corresponding air spring when air is gently discharged from the air spring. That is, the ascent limit Hmax and the descent limit Hmin are ascent and descent limit values of the ride section 100 based on the measured values by the sensor 150 at each position.

The upper margin 71 is set downward from the ascent limit Hmax to about 50% to 70% of a range between the ascent and descent limit values (from the ascent limit Hmax to the descent limit Hmin). In order to further extend the service life of the air spring, 50% is preferable.

The lower margin 72 is set upward from the descent limit Hmin to about 5% of the range between the ascent and descent limit values, for example. Although the lower margin 72 does not contribute to the extension of the service life of the air spring, 5% is preferable to prevent the air spring from "hitting the bottom" and leave a moderate floating feeling as if the ride section 100 were floating on water.

That is, the ascent and descent control range 710 (a range indicated by a thick white arrow) is a range obtained by determining the ascent and descent limits of the ride section 100 based on the measured values by the sensor 150 and excluding the predetermined margins from the ascent and descent limits.

In other words, in order to maintain the individual target height Hp within the ascent and descent control range 710 even if the ride section 100 tilts at a maximum allowable angle, the target reference height Ht itself is set within the ascent and descent control range 710.

Each of the control patterns defines how to change the height from the current height Hn to the individual target height Hp within the required control time length ΔT. Each of the control patterns is equally set such that an air supply/discharge amount into/from the air spring is gradually reduced as the current height Hn based on the measured value by the sensor 150 approaches the individual target height Hp. In FIG. 7, this is illustrated as an inclination of the graph representing an air supply/discharge amount pace per unit time. However, a number of stages of gradual reduction is set to vary depending on the required control time length ΔT. The number of stages of the gradual reduction is illustrated by several reference heights indicated by the small black dots in the graph. That is, the number of stages of the gradual reduction (a number of settings of the reference heights) increases as the required control time length ΔT becomes longer.

For example, the control pattern having the required control time length ΔT1 which is relatively short is intended to produce stage effects to make the user feel an "impact". Accordingly, this control pattern is set to include a smaller number of stages of the gradual reduction so as to drastically change the height to reach the individual target height Hp1.

For example, the control pattern having the required control time length ΔT3 which is relatively long is intended to produce stage effects to make the user feel a "gentle change". Accordingly, this control pattern is set to include a larger number of stages of the gradual reduction so as to gradually change the height to gently reach the individual target height Hp3.

For example, compare the control pattern with the individual target height Hp2 and the control pattern with the individual target height Hp4 both having the same required control time length ΔT2. Both of the control patterns are intended to produce stage effects to make the user feel a "moderate change". Although the former control pattern needs to change the height faster than the latter control pattern, the former control pattern changes the height through more stages than the stages taken by the latter control pattern so as to smooth the air supply/discharge amount pace.

As described above, the control patterns are variously set by the required control time length ΔT and the required height change amount ΔH from the current height Hn to the individual target height Hp. Each of the control patterns is defined by predetermined control pattern definition data 550 as illustrated in FIG. 8.

The control pattern definition data 550 includes a pattern ID 552, an application requirement 554, and pattern initial setting table data 556.

The application requirement 554 indicates details to be satisfied to select the control pattern definition data 550. The application requirement 554 is described by a combination of a required control time length condition 554a and a required individual height change amount condition 554b.

The pattern initial setting table data 556 indicates an initial setting of a control signal output pattern of the control pattern definition data 550. In particular, the pattern initial setting table data 556 stores a control signal value 556b and a duration 556c in association with execution order 556a, the number of which corresponds to the number of stages of the change. The amusement game equipment 10 performs output control of the control signal value 556b for the duration 556c in the associated execution order 556a. The control signal value 556b determines the air supply/discharge amount pace by PWM control.

FIG. 7 and FIG. 8 illustrate examples where air is supplied to the air spring to raise the height, and thus the air supply amount pace is gradually reduced as the height approaches the individual target height Hp in each piece of the control pattern definition data 550. Similarly, the control pattern definition data 550 is also used when air is discharged from the air spring to lower the height. However, in this case, a vertical relationship between the current height Hn and the individual target height Hp is reversed, and graph lines in FIG. 7 are reversed upside down. Each piece of the control pattern definition data 550 indicates the air discharge amount pace which is gradually reduced as the height approaches the individual target height Hp.

Figure 9:
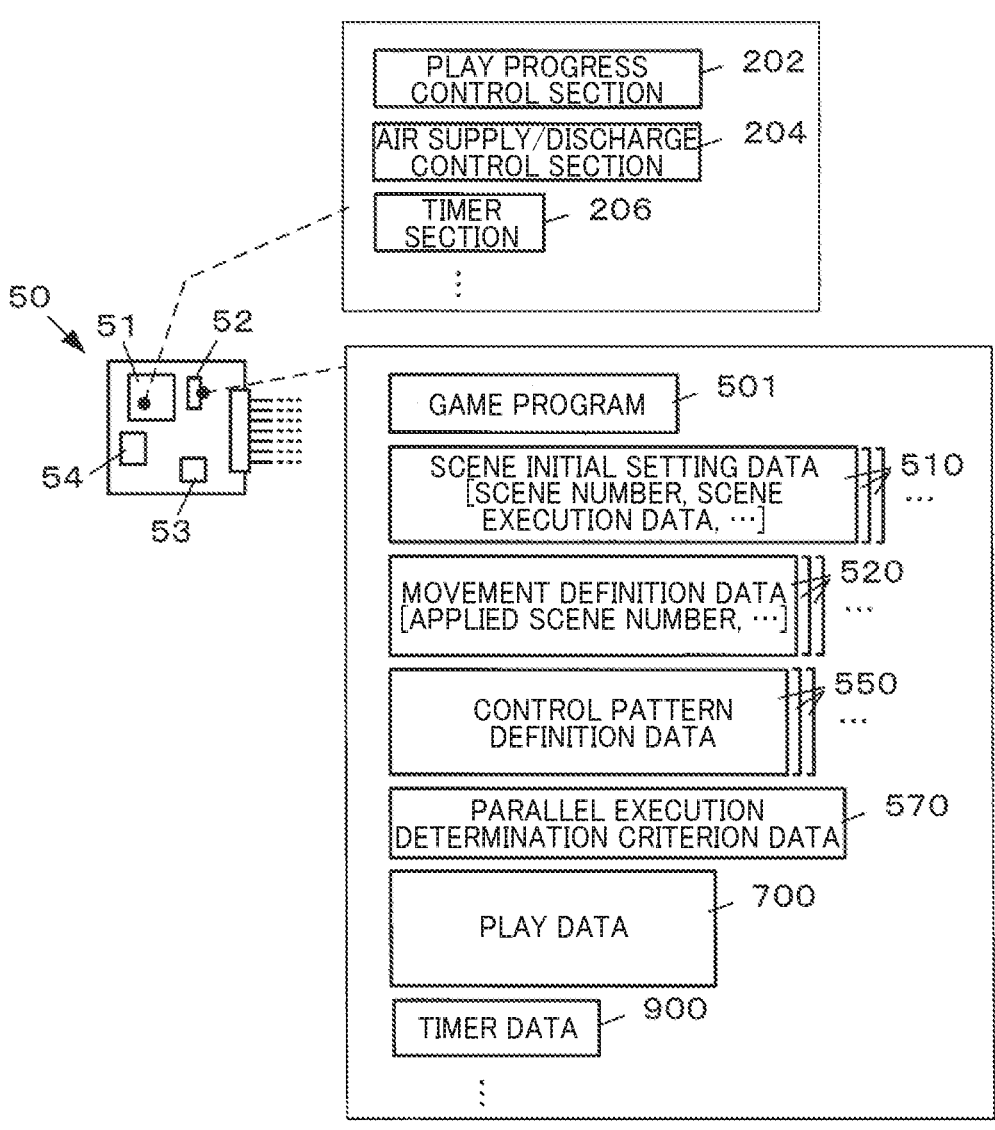
FIG. 9 is a diagram illustrating an example of functional sections implemented by a control section and an example of a program and data stored in a functional section.

FIG. 9 is a diagram illustrating an example of functional sections implemented by the control section 50 and an example of a program and data stored in the control section 50.

The control section 50 stores a game program 501, scene initial setting data 510, the movement definition data 520 (see FIG. 5), the control pattern definition data 550 (see FIG. 8), play data 700, and timer data 900 in an IC memory 52. Other types of data can be stored as appropriate, of course.

The game program 501 is executed by a CPU 51 to cause the control section 50 to implement functions as a game progress control section 202 related to control of game progress, air supply/discharge control section 204 that controls the air supply/discharge into/from the air spring section 110, and a timer section 206 that measures a lapse time from a play start or the like.

In view of that the reference heights (small black dots in FIG. 7; switching points of the gradual control) are defined with respect to the lapse times in each of the control patterns, the air supply/discharge control section 204 of the control section 50 selects the applied control pattern from the plurality of control patterns having different air supply/discharge amount paces based on the difference between the current height Hn based on the measured value by the sensor 150 and the individual target height Hp, and generates the control signal to make the current height Hn based on the measured value by the sensor 150 follow the applied control pattern.

The scene initial setting data 510 is prepared for each scene according to the game progress, and stores various types of initial setting data for implementing the gameplay in each scene. For example, the scene initial setting data 510 stores model data of background objects forming a game space for the boat ride in the river, model data of the small boat, data of set positions of the check points, or a clearing time. The scene may be read as a game stage depending on game content.

The play data 700 stores various types of data that describe a state of the game progress control.

Figure 10:
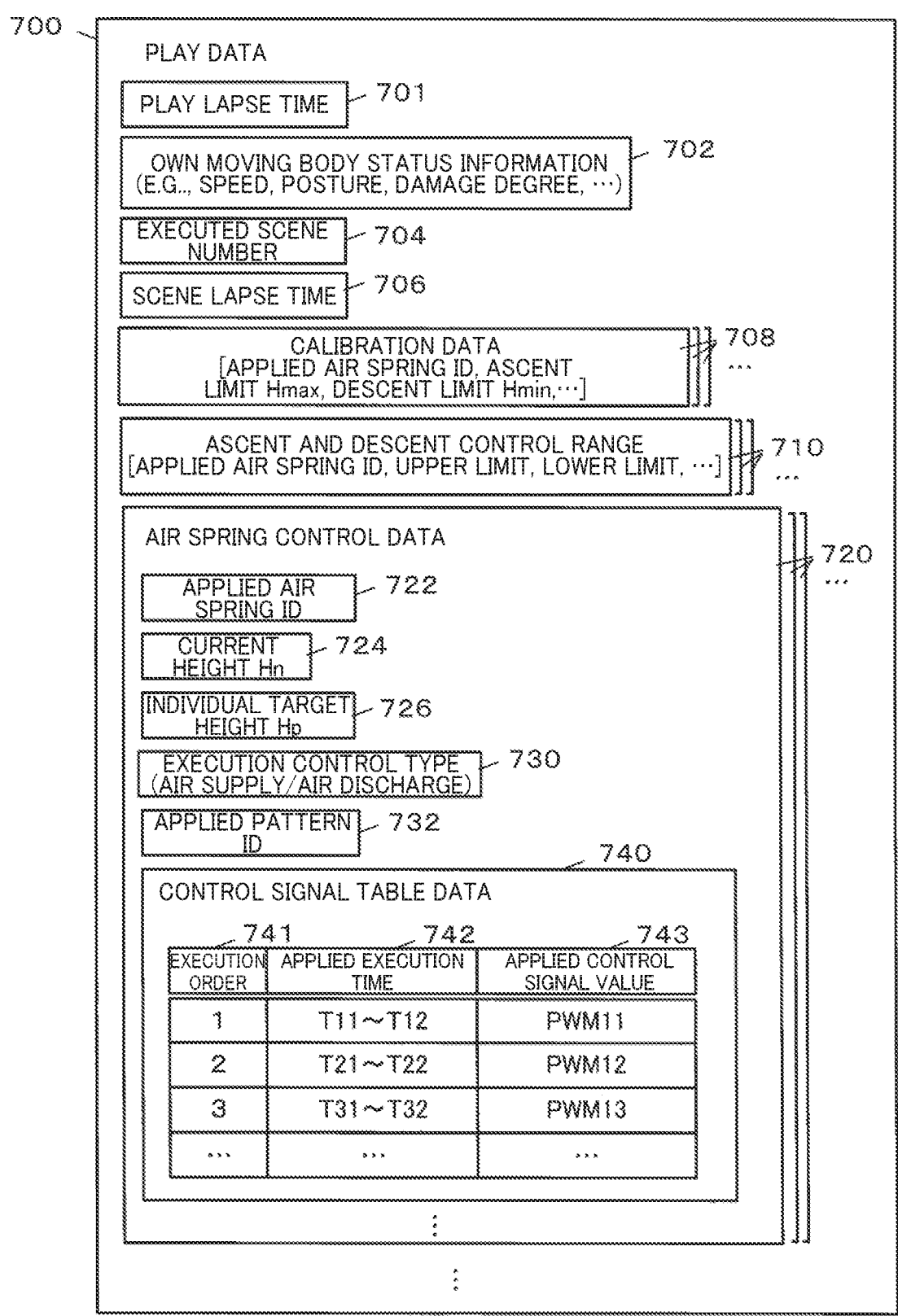
FIG. 10 is a diagram illustrating a data configuration example of play data.

As illustrated in FIG. 10, for example, the play data 700 includes a play lapse time 701 from a play start, own character status information 702, an executed scene number 704, a scene lapse time 706 from a scene start, and calibration data 708 for each of the air springs. In addition, the play data 700 also includes the ascent and descent control range 710 for each of the air springs, and air spring control data 720 prepared for each of the four air springs in the air spring section 110. Other types of data can be included as appropriate, of course.

The own character status information 702 includes various types of data describing latest status of the small boat (player character) operated by the user 2 of the player. For example, the own character status information 702 includes speed, posture, or a damage degree.

The calibration data 708 is prepared for each of the first air spring 111 to the fourth air spring 114, and stores a calibration result. For example, the calibration data 708 stores the ascent limit Hmax and the descent limit Hmin (see FIG. 7).

The ascent and descent control range 710 is prepared for each of the first air spring 111 to the fourth air spring 114, and stores values of an upper limit and a lower limit of the ascent and descent control range 710 (see FIG. 7). The ascent and descent control range 710 is obtained as a result of the calibration process, and thus the calibration data 708 may include the ascent and descent control range 710.

One piece of the air spring control data 720 includes an applied air spring ID 722 indicating which air spring the control data is applied to, a current height 724, an individual target height 726, and an execution control type 730 indicating whether to supply air or discharge air into/from the air spring of the control data. The one piece of the air spring control data 720 also includes an applied pattern ID 732 indicating the control pattern applied to the air spring of the control data, and control signal table data 740 setting the control signal output to the air spring of the control data. Other types of data can be included as appropriate, of course.

The control signal table data 740 is a copy of the pattern initial setting table data 556 (see FIG. 8) of the control pattern definition data 550 indicated by the applied pattern ID 732. The control signal table data 740 may be omitted and the pattern initial setting table data 556 may be directly read out.

Figure 11:
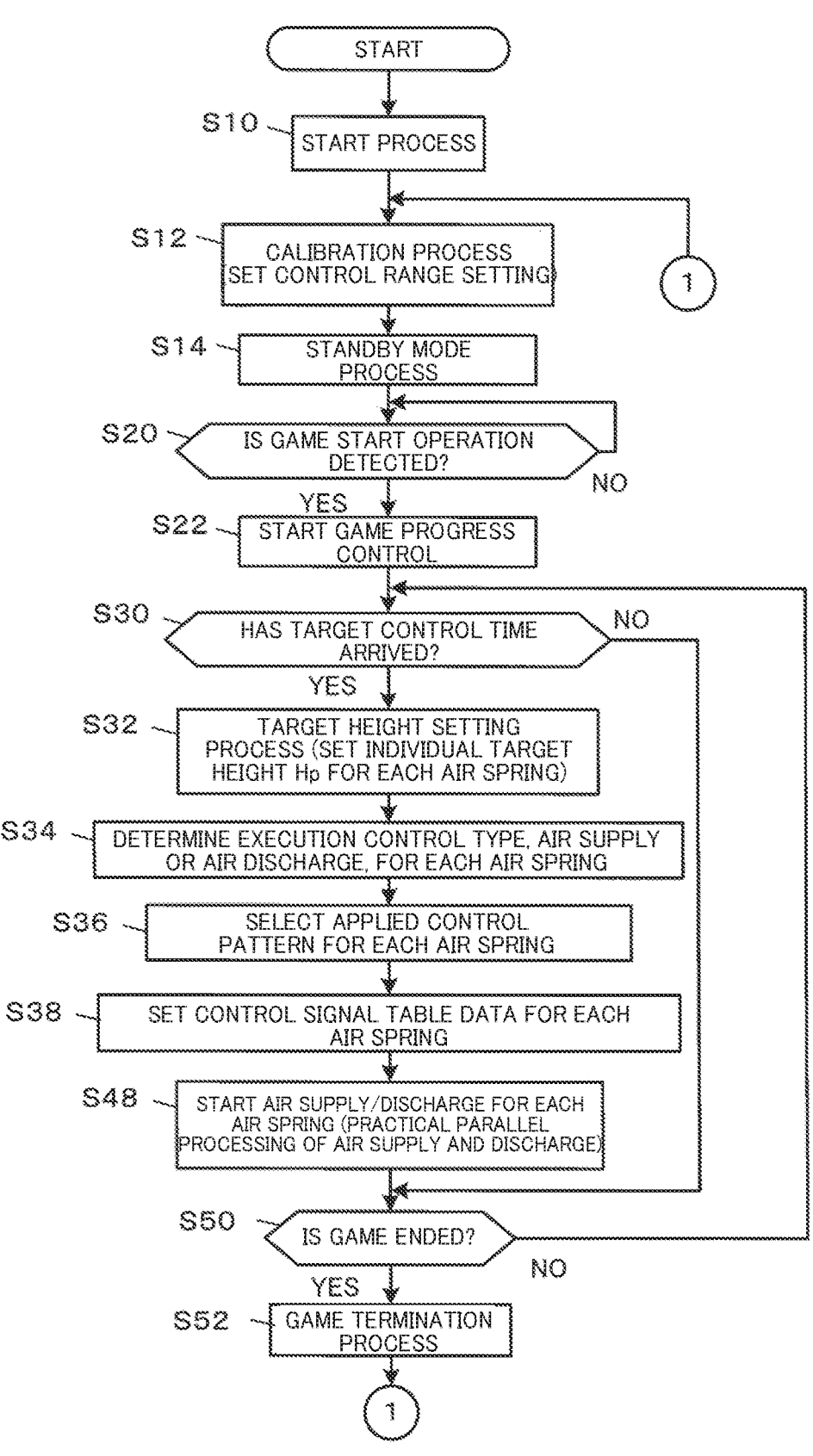
FIG. 11 is a flowchart illustrating a flow of processes performed by the control section.

FIG. 11 is a flowchart illustrating a flow of processes performed by the control section 50.

When the amusement game equipment 10 is turned on, the amusement game equipment 10 first performs a predetermined start process (step S10), and performs a calibration process (step S12).

In the calibration process, the amusement game equipment 10 performs control for gently and simultaneously supplying air into the first air spring 111 to the fourth air spring 114, and sets a maximum measured value by each of the sensors 150 as the ascent limit Hmax of the air spring corresponding to each of the sensors 150. Next, the amusement game equipment 10 performs control for gently and simultaneously discharging air from the first air spring 111 to the fourth air spring 114, and sets a minimum measured value by each of the sensors 150 as the descent limit Hmin of the air spring corresponding to each of the sensors 150. Then, the amusement game equipment 10 sets the ascent and descent control range 710 (see FIG. 7).

Next, the amusement game equipment 10 starts a standby mode process, and displays a predetermined sample video image showing gameplay on the display 12 (step S14).

When the amusement game equipment 10 detects predetermined game start operation through the operation section 162 (see FIG. 2) during the standby mode (YES at a step S20), the amusement game equipment 10 terminates the standby mode process and starts the game progress control (step S22). At this time, the air spring section 110 is controlled to implement the target tilt direction φt, target tilt angle θt, and target reference height Ht indicated by a first target control time 523 in the movement definition data 520 (see FIG. 5) of a first scene. The ride section 100 is normally set in a horizontal posture in a middle of the ascent and descent control range 710 when the game progress control is started.

Once the game progress control is started, the amusement game equipment 10 refers to the movement definition data 520 applied to the currently executed scene, and monitors arrival of the target control time 523 (see FIG. 5).

Then, when the target control time 523 arrives (YES at a step S30), the amusement game equipment 10 performs a target height setting process (step S32). In particular, the amusement game equipment 10 sets the individual target height Hp to each of the first air spring 111 to the fourth air spring 114 to implement the next target tilt direction φt, target tilt angle θt, and target reference height Ht corresponding to the next target control time Tt (see FIG. 4) at the next target control time Tt next to the arrived current target control time Tt.

Next, the amusement game equipment 10 refers to the parallel execution determination criterion data 570 (see FIG. 6) to determine the execution control type 730 (see FIG. 10) regarding whether to perform the air supply control (to raise) or the air discharge control (to lower) until the next target control time Tt for each of the first air spring 111 to the fourth air spring 114 (step S34).

Next, the amusement game equipment 10 selects the applied control pattern to be applied for each of the first air spring 111 to the fourth air spring 114 (step S36). That is, the amusement game equipment 10 selects the definition data, the application requirement 554 of which is satisfied, from a plurality of pieces of the control pattern definition data 550 (see FIG. 8), and copies the pattern initial setting table data 556 of the selected definition data to the control signal table data 740 (see FIG. 10) to set it (step S38).

Next, the amusement game equipment 10 starts control for generating and outputting the control signal in accordance with the control signal table data 740 for each of the air springs (step S48). The amusement game equipment 10 outputs the control signal to the air supply solenoid valve 122 for the air spring the execution control type 730 of which indicates "air supply". The amusement game equipment 10 outputs the control signal to the air discharge solenoid valve 118 for the air spring the execution control type 730 of which indicates "air discharge".

Accordingly, the air supply/discharge control is performed for the first air spring 111 to the fourth air spring 114 according to the control pattern indicated by the applied pattern ID 732 until the next target control time Tt arrives. The first air spring 111 to the fourth air spring 114 are raised or lowered to change the position and posture of the ride section 100 so as to produce the movements of the ride section 100 according to the intended stage effects.

The amusement game equipment 10 repeatedly performs the step S30 to the step S48 until the game ends. Once the game ends, the amusement game equipment 10 performs a predetermined game termination process such as announcement of a play result (step S52), performs the calibration process again, and returns to the standby mode.

As described above, according to the present embodiment, it is possible to implement ride-type body experience amusement game equipment that implements a new control technique related to the air supply/discharge of the air springs supporting the ride section. That is, the amusement game equipment 10 sets the ascent and descent control range 710 within a range not reaching the ascent and descent limits of the ride section 100 by the calibration process. Then, the air spring section 110 is controlled to ascend and descend within the ascent and descent control range 710. This eliminates "effects of an impact of high expansion pressure at the moment the air spring reaches its maximum stroke", which is one of the factors that shorten the service life of the air spring in conventional amusement game equipment, and frequent control for quickly repeating the maximum stroke and the minimum stroke alternately. As a result, the amusement game equipment 10 can implement the new control technique related to the air supply/discharge of the air springs supporting the ride section 100.

Moreover, the amusement game equipment 10 individually performs the air supply/discharge control for a plurality of air springs (the first air spring 111 to the fourth air spring 114) included in the air spring section 110 to individually perform the ascent/descent control for the plurality of the air springs. As a result, the movements of the moving body (small boat in the game in the present embodiment) that the player is assumed to be on board in the game world can be reproduced in the real world by the ascent and descent of the ride section 100 and changes in the posture of the ride section 100. When the air supply into one or some of the first air spring 111 to the fourth air spring 114 and the air discharge from other air springs are executed in parallel, quick changes in the posture of the ride section 100 become possible, which can greatly expand a scope of stage effects.

MODIFICATION EXAMPLES

The embodiment to which the present disclosure is applied has been described above. However, the mode to which the present disclosure is applicable is not limited to this embodiment, and various modifications may be made as appropriate, such as adding other components, or omitting or changing some of the components.

Modification Example 1

For example, in the embodiment described above, the game that makes the player virtually experience the "boat ride in the torrent river" is described as an example of the game content. However, the game content is not limited to this. The game content may be anything if it is a game in which the user 2 of the player is on some kind of moving body, and the moving body moves up and down to cause a roll, pitch, or yaw of itself in the game. For example, the game content may be a body experience shooting game in which the player is on an airplane, a spaceship, a combat vehicle, a combat robot, a horse, or the like, and shoots an enemy in an encounter in a game field. The game content may be a game with a theme of experiencing a virtual roller coaster.

Modification Example 2

Furthermore, in the embodiment described above, the control signal table data 740 is the copy of the pattern initial setting table data 556 of the control pattern definition data 550. However, the control signal table data 740 is not limited to this (see the step S38 in FIG. 11). For example, the control section 50 may estimate a weight of the user 2 of the player, and performs a change process for changing the control signal value 743 of the control signal table data 740 from the copy of the pattern initial setting table data 556.

Figure 12:
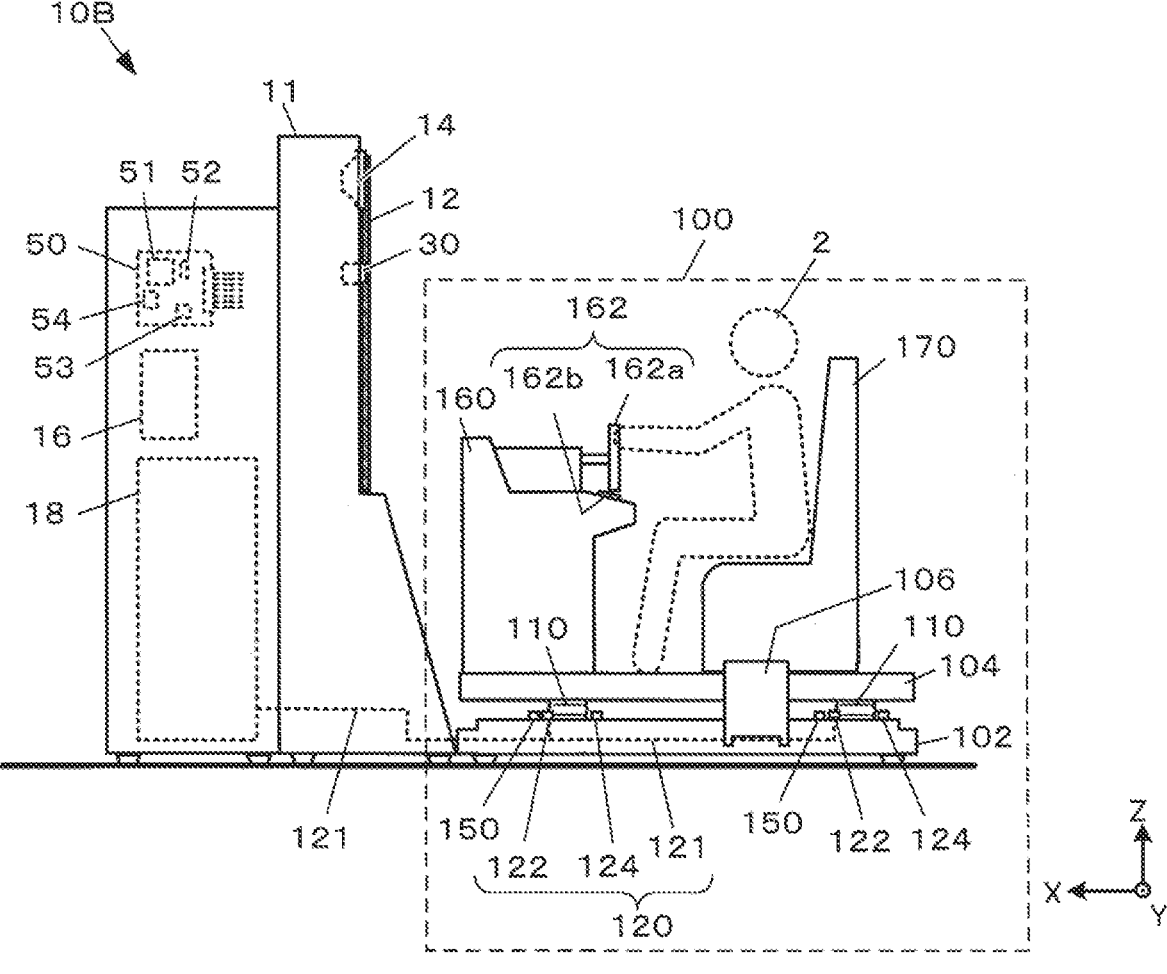
FIG. 12 is a side view of a configuration of amusement game equipment according to a modification example.

In particular, as illustrated in FIG. 12, amusement game equipment 10B additionally includes an image sensor 30 that captures an image of the seat 170 from a front of the ride section 100. The image sensor 30 outputs captured image data to the control section 50.

Then, as illustrated in FIG. 13, when the amusement game equipment 10B detects the game start operation (YES at the step S20), the amusement game equipment 10B performs an image recognition process to recognize at least one human figure in the image captured by the image sensor 30, and calculates the estimated weight from the recognized human figure (step S21). As for the estimated weight, table data for calculating the estimated weight from the size or height of the recognized human figure is prepared beforehand. Then, the amusement game equipment 10B sums up the estimated weights of the recognized human figures.

Moreover, the amusement game equipment 10B copies the pattern initial setting table data 556 to the control signal table data 740 at the step S38, and then, performs a control signal change process (step S40). In the control signal change process, the control signal value 743 of the control signal table data 740 is changed such that the control signal value 743 of the control signal table data 740 is changed more as the summed up estimated weight is heavier.

At the step S40, for the air spring the execution control type 730 (see FIG. 10) of which is the "air supply", the control signal value 743 is changed to increase the air supply pace more as the estimated weight calculated at the step S21 is heavier. This increases ascent power of the air spring, so that the air spring ascends as a game creator intended regardless of the weight of the player.

For the air spring the execution control type 730 of which is the "air discharge", the control signal value 743 is changed to reduce the air discharge pace more as the estimated weight calculated at the step S21 is heavier. This reduces a descent pace of the air spring, so that the air spring can be prevented from descending at a pace that the game creator did not intend by the weight of the player.

That is, even when a heavy load of the player is on the seat 170 of the ride section 100, movements intended by the game creator are implemented. In addition, since the estimated weight is calculated based on the size and height of the image of the recognized human figure, the control signal value 743 can be appropriately changed regardless of whether the user 2 sitting on the seat 170 is an adult or a child, or a number of users is one or more.

Modification Example 3

The control section 50 may generate the control signal to variably control the air supply/discharge into/from the air spring section 110 based on the operation of the operation section 162. For example, in the change process at the step S40 in FIG. 13, the control signal value 743 of the control signal table data 740 may be changed according to operation input in addition to the change according to the estimated weight of the player.

In particular, when the user 2 of the player performs the operation input, the control signal value 743 is adjusted according to the operation input while the operation input is being performed. For example, if the operation input for a left turn is performed, and the control signal values 743 of the first air spring 111 and the third air spring 113 on the right side of the ride section 100 are set to the signal values for supplying air, the amusement game equipment 10B changes the control signal values 743 to increase the air supplying pace. On the contrary, if the control signal values 743 of these air springs are set to the signal values for discharging air, the amusement game equipment 10B changes the control signal values 743 to reduce the air discharge pace.

On the other hand, if the operation input for the left turn is performed, and the control signal values 743 of the second air spring 112 and the fourth air spring 114 on the left side of the ride section 100 are set to the signal values for supplying air, the amusement game equipment 10B changes the control signal values 743 to reduce the air supplying pace. On the contrary, if the control signal values 743 of these air springs are set to the signal values for discharging air, the amusement game equipment 10B changes the control signal values 743 to increase the air discharge pace.

As a result, the ride section 100 can express occurrence of banking due to the left turn, that is, a change in yaw angle. In a case of a right turn, a change relationship of the control signal values 743 may be reversed between right and left.

Similarly, the ride section 100 can express a change in pitch toward an ascending posture according to raising operation by the user 2 of the player.

In particular, if the raising operation or accelerating operation is performed, and the control signal values 743 of the first air spring 111 and the second air spring 112 on the front side of the ride section 100 are set to the signal values for supplying air, the amusement game equipment 10B changes the control signal values 743 to increase the air supplying pace. On the contrary, if the control signal values 743 of these air springs are set to the signal values for discharging air, the amusement game equipment 10B changes the control signal values 743 to reduce the air discharge pace.

On the other hand, if the raising operation or the accelerating operation is performed, and the control signal values 743 of the third air spring 113 and the fourth air spring 114 on the rear side are set to the signal values for supplying air, the amusement game equipment 10B changes the control signal values 743 to reduce the air supplying pace. On the contrary, if the control signal values 743 of these air springs are set to the signal values for discharging air, the amusement game equipment 10B changes the control signal values 743 to increase the air discharge pace.

As a result, the ride section 100 can express the change in pitch angle due to the ascent. In a case of lowering operation, a change relationship of the control signal values 743 may be reversed between front and rear.

Furthermore, as an alternative example of the change according to the operation input, "jump" operation is assigned to one of the operation switches 162*b* (see FIG. 2). Then, when this operation switch 162*b* is operated, the amusement game equipment 10B performs the change process to change the control signal values 743 such that the air springs are forcibly raised and then lowered for a predetermined time. This can express the movement of the ride section 100 due to the jump intended by the user 2.

Although only some embodiments of the present disclosure have been described in detail above, those skilled in the art will readily appreciate that many modifications are possible in the embodiments without materially departing from the novel teachings and advantages of this disclosure. Accordingly, all such modifications are intended to be included within scope of this disclosure.

What is claimed is:

1. Amusement game equipment comprising:
a ride section on which a user rides;
an air spring section configured to support the ride section;
an air supply/discharge adjustment section configured to perform air supply and discharge into/from the air spring section according to a given control signal;
a sensor configured to measure a height of a reference plane of the ride section; and
a control section configured to generate the control signal according to game progress to control the air supply and discharge into/from the air spring section, wherein the control section
performs a calibration process for controlling the air supply and discharge into/from the air spring section to determine an ascent limit of the ride section based on a measured value by the sensor so as to set an ascent and descent control range excluding a predetermined margin from the ascent limit,
performs a target height setting process for setting a target height of the ride section within the ascent and descent control range according to the game progress, and
generates the control signal for controlling the air supply and discharge into/from the air spring section to achieve the target height.

2. The amusement game equipment as defined in claim 1, wherein the control section
determines a descent limit of the ride section based on the measured value by the sensor, and sets a position higher than the descent limit by a predetermined margin as a lower limit of the ascent and descent control range in the calibration process, and
generates the control signal such that a current height based on the measured value by the sensor does not fall below the lower limit of the ascent and descent control range.

3. The amusement game equipment as defined in claim 2, wherein the air spring section includes a plurality of air springs that support different positions of the ride section,
wherein the air supply/discharge adjustment section individually performs the air supply and discharge for each of the plurality of air springs,
wherein the sensor measures, for each of the plurality of air springs, the height of the reference plane of the ride section supported by each of the plurality of air springs,
wherein the target height setting process includes setting a target tilt direction and a target tilt angle of the ride section generated by a difference in the heights supported by the plurality of air springs according to the game progress, and
wherein the control section selects both at least one air spring to supply air and at least one air spring to discharge air based on the measured value of each of the plurality of air springs measured by the sensor, the target tilt direction, and the target tilt angle, and generates the control signals to perform the air supply and discharge in parallel.

4. The amusement game equipment as defined in claim 1, wherein the control section generates the control signal to gradually reduce an air supply/discharge amount into/from the air spring section as a current height based on the measured value by the sensor approaches the target height.

5. The amusement game equipment as defined in claim 4, wherein the control section selects an applied control pattern according to the game progress from a plurality of control patterns having different paces of the air supply/discharge amount, and generates the control signal based on the applied control pattern.

6. The amusement game equipment as defined in claim 5, wherein at least one reference height with respect to a lapse time is set to each of the plurality of control patterns, and wherein the control section generates the control signal such that the current height based on the measured value by the sensor follows the applied control pattern.

7. The amusement game equipment as defined in claim 4, wherein the control section selects an applied control pattern from a plurality of control patterns having different paces of the air supply/discharge amount based on a difference between the current height based on the measured value by the sensor and the target height, and generates the control signal based on the applied control pattern.

8. The amusement game equipment as defined in claim 7 further comprising an operation section operated by the user during gameplay, wherein the control section generates the control signal to variably control the air supply and discharge into/from the air spring section based on operation of the operation section.

9. The amusement game equipment as defined in claim 1, wherein the air spring section includes a plurality of air springs that support different positions of the ride section, wherein the air supply/discharge adjustment section individually performs the air supply and discharge for each of the plurality of air springs, wherein the sensor measures, for each of the plurality of air springs, the height of the reference plane of the ride section supported by each of the plurality of air springs, wherein the target height setting process includes setting a target tilt direction and a target tilt angle of the ride section generated by a difference in the heights supported by the plurality of air springs according to the game progress, and wherein the control section selects both at least one air spring to supply air and at least one air spring to discharge air based on the measured value of each of the plurality of air springs measured by the sensor, the target tilt direction, and the target tilt angle, and generates the control signals to perform the air supply and discharge in parallel.

10. The amusement game equipment as defined in claim 1 further comprising a regulation section configured to regulate a change of a position of the ride section in a height direction exceeding a predetermined limited height.

* * * * *